United States Patent [19]
Schumacher et al.

[11] Patent Number: 5,722,456
[45] Date of Patent: Mar. 3, 1998

[54] HYDRAULIC UNIT

[75] Inventors: Steffen Schumacher, Renningen; Kurt Gensheimer, Bad Liebenzell, both of Germany

[73] Assignee: Robert Bosch GmbH, Stuttgart, Germany

[21] Appl. No.: 701,079

[22] Filed: Aug. 21, 1996

[30] Foreign Application Priority Data

Aug. 22, 1995 [DE] Germany .............. 195 30 748.8
Jul. 24, 1996 [DE] Germany .............. 196 29 873.3

[51] Int. Cl.$^6$ ........................................... F16K 27/00
[52] U.S. Cl. ............... 137/550; 137/596.17; 137/884; 210/445; 210/495; 277/23
[58] Field of Search ............... 137/550, 596.17, 137/884; 210/445, 495; 277/23

[56] References Cited

U.S. PATENT DOCUMENTS

| | | | |
|---|---|---|---|
| 3,168,468 | 2/1965 | Jagdmann | 210/445 X |
| 3,206,216 | 9/1965 | Crook | 277/23 |
| 3,538,947 | 11/1970 | Leiber et al. | 137/550 |
| 4,264,443 | 4/1981 | Anderson et al. | 210/445 |
| 4,678,006 | 7/1987 | Northman et al. | 137/596.17 |
| 4,828,694 | 5/1989 | Leason | 210/445 X |
| 5,086,803 | 2/1992 | Nakajima | 137/884 X |
| 5,174,336 | 12/1992 | Casey et al. | 137/550 X |

*Primary Examiner*—Gerald A. Michalsky
*Attorney, Agent, or Firm*—Michael J. Striker

[57] ABSTRACT

A hydraulic unit is connected with a control plate of a transmission with the use of a sealing element. The sealing element performs in addition to its sealing function for sealing the hydraulic passages from one another and from outside, also a parallel filtering function for preventing the dirt contained in the pressure medium from regulators of the hydraulic unit. Addition to the reduction of components, the sealing element can be mounted automatically and reliably fixed in position. Also, the sealing element can be produced cost-favorably and in any complex shape. Adaptation of the sealing element to the corresponding sealing applications is possible without additional expenses.

17 Claims, 4 Drawing Sheets

HYDRAULIC UNIT

BACKGROUND OF THE INVENTION

The present invention relates generally to a hydraulic unit having an electromagnetic regulator.

Such hydraulic units are used for example in motor vehicles, in which they are mounted on control plates of automatic transmissions and control or regulate the pressure medium flow. The hydraulic transitions produced by the mounting between the control plate of the automatic transmission and the supporting plate of the hydraulic part are sealed from one another and from outside. In order to prevent damages to the electromagnetic regulator by dirt particles in the pressure medium, separate filter components are used in the supply and discharge passages of the regulator.

It is known to use flat seals (paper seals) for sealing of two surfaces. These sealing components require, however, plainly machined, smoothed and therefore expansibly manufactured surfaces, since they can compensate unevenness or elasticity in the sealing structure, for example under the action of temperature fluctuations, only a little. Also, for the same reason the flat seals can not be used in the case of sealing surfaces of synthetic plastic material. These disadvantages are eliminated by seals composed of elastomeric material. They are generally known and can be used as shaped seals. Their disadvantage, however, is that they must be inserted in grooves provided at least on one of the surfaces to be sealed, and their manufacture requires expensive, material-removing machining. Such an elastomeric seals also have a low shape stability and therefore can be mounted only manually.

For filtering the pressure medium it is also known to use a separate filter arranged in the suction passage of the support plate. Since this filtering of the pressure medium is relatively far from the regulators, a damage of the regulator because of the residual dirt from the pressure medium passages is not reliably prevented. This disadvantage can be eliminated by arranging each regulator directly before a filter. However, such system involves a plurality of small components and sealing points, which increases the expenditures for the mounting. Furthermore, the flange geometry of the regulator is such that only a filter with relatively low filter cross-section can be used, which during the use of the hydraulic unit causes a high maintenance expenses. In a series production also there are quality risks because of damage or not mounted seals, which can be generally recognized only by expensive testing technique.

SUMMARY OF THE INVENTION

Accordingly, it is an object of the present invention to provide a hydraulic unit which avoids the disadvantages of the prior art.

In keeping with these objects and with others which will become apparent hereinafter, one the feature of the present invention resides, briefly stated, in a hydraulic unit with at least one electromagnetic regulator inserted in a supporting plate and controlling supply, return and bypass passages formed in the supporting plate, with at least one sealing element having sealing strands or connecting strands and arranged on the end surface of the supporting plate on which the hydraulic passages open, wherein in accordance with the invention the sealing or connecting strands of the sealing element extend along an outer contour of a flexible, filtering fabric and have at least one branching, the sealing or connecting strands extend to both sides of the filtering fabric, and the strands surround at least one region of the sealing element through which the pressure medium flows and at least one region of the sealing element through which the pressure medium does not flow.

When the hydraulic unit is designed in accordance with the present invention, it has the advantage that the sealing element between the supporting plate of the hydraulic unit and the control plate of the transmission performs a joint function of a conventional sealing and a filter. Thereby the number of individual components can be substantially reduced. For a series production therefore the costs for materials, mounting and testing are reduced to a simultaneous quality improvement. The position of the sealing element facilitates filtering of the pressure medium near the dirt-sensitive regulators and at the same time provides for a relatively great filter cross-section. The filtering fabric imparts a certain shape stability to the sealing element. This makes possible and approximately free design of the sealing contours with relatively thin sealing cross-sections. In addition, the sealing element can be mounted automatically and exactly positioned on the surface to be sealed.

A sealing element can be produced especially simple and cost-favorable when the filtering fabric is formed for one-piece. For improving the filtering action of the filtering fabric, it is also recommended to arrange several fabric layers one behind the other and to offset or turn them relative to one another. An especially good positioning of the sealing element during the mounting can be obtained when the regions through which the pressure medium does not flow are provided with recesses cooperating with fixing elements of the supporting plate. When the fixing elements after the mounting of the sealing elements are plastically deformed, the sealing elements are firmly positioned in places. In connection with a variation of the cross-section of the receiving strand, the distribution of the pressure receiving element can be adjusted in broad limits.

Further advantages are provided by the design of the sealing strands. They are produced by injection molding or vucanization and can be varied in broad regions in correspondence with the requirements without significant expenses. For example, the pressing force on the sealing surface with a predetermined pressure can be regulated at the sealing element by different diameter of the sealing strand. Undesired deformation of the sealing surfaces can be prevented by unlimited sealing functions. On the other hand, the cross-sectional shape of the sealing strand of the respective surface to be sealed can be adjusted in correspondence with the acting pressure level or the sealing problems. At critical points, the edge zone of the sealing element which serves substantially for engaging the filtering fabric provides a second sealing function. Eventual damages to the inner seal therefore does not lead to outer untightness.

If an elastomeric material is used as a sealing material, there is the advantage that the supporting plates of the hydraulic part which form sealing partners with one another can be produced of cost-favorable synthetic plastic material. Because of the high compressibility and elasticity of elastomers, the unevenness in the synthetic plastic parts caused by injection molding or temperature expansion can be compensated. A supporting plate of synthetic plastic material provides in addition to the favorable manufacturing cost, the additional advantage that the formation of sealing grooves of fixing elements for the sealing element is simple and do not involve additional costs. Also the fixing elements of synthetic material can be relatively simply plastically deformed with low energy application.

DESCRIPTION OF PREFERRED EMBODIMENTS

DESCRIPTION OF PREFERRED EMBODIMENTS

Figure 1:
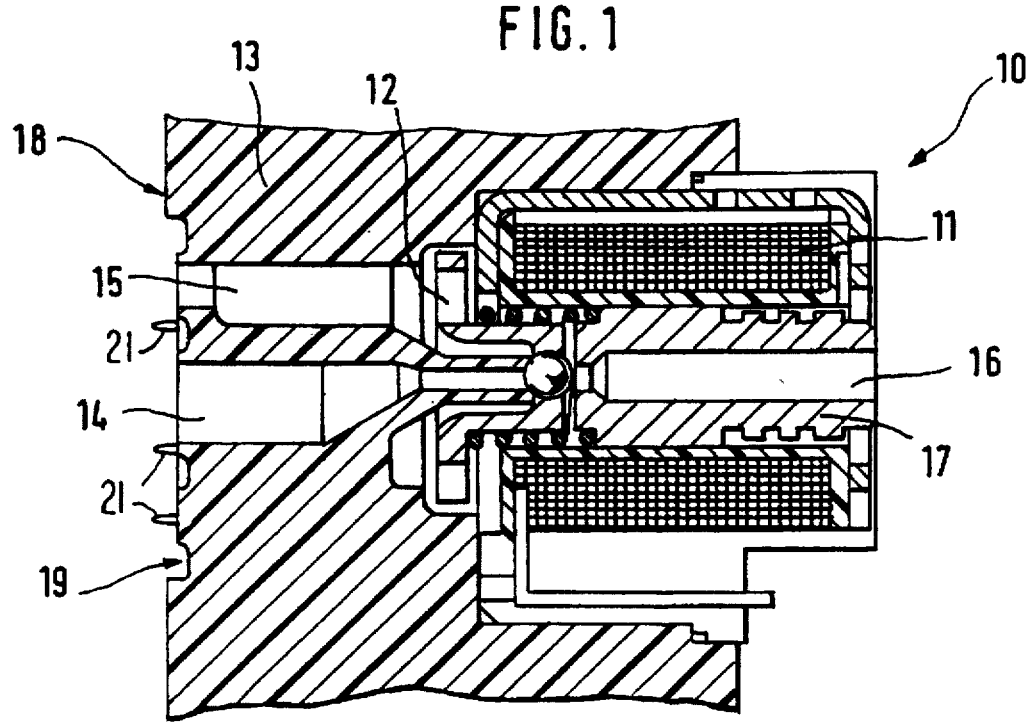
FIG. 1 is a view showing a hydraulic unit in accordance with the present invention.

A hydraulic unit in accordance with the present invention is shown in FIG. 1 and identified with reference numeral 10. It has a regulator provided with an electrically actuated magnetic part 11 which is received in a supporting plate 13 and fixed there. The magnetic part 11 cooperates with an armature 12. The armature 12 controls a supply passage 14, a discharge passage 15 and a return passage 16. The return passage 16 is located in a coil core 17 of the magnetic part 11, the supply passage 14 and the discharge passage 15 are formed in the supporting plate 17. Several such regulators can be inserted in the supporting plate 13.

The side of the supporting plate 13 which faces away from the magnetic part 11 is formed as a substantially plane sealing surface 18. In the region of the openings of the supply and discharge passages 14 and 15, it has several sealing grooves 19. A synthetic plastic injection-molding process is utilized for a cost-favorable and simple manufacture of the supporting plate 13. The hydraulic unit 10 with a not shown control plate is screwed by means of not shown screw connection, for example on an automatic transmission. A sealing element 20 shown in FIG. 2 is arranged between the supporting plate 13 and the control plate of the transmission.

Figure 2:
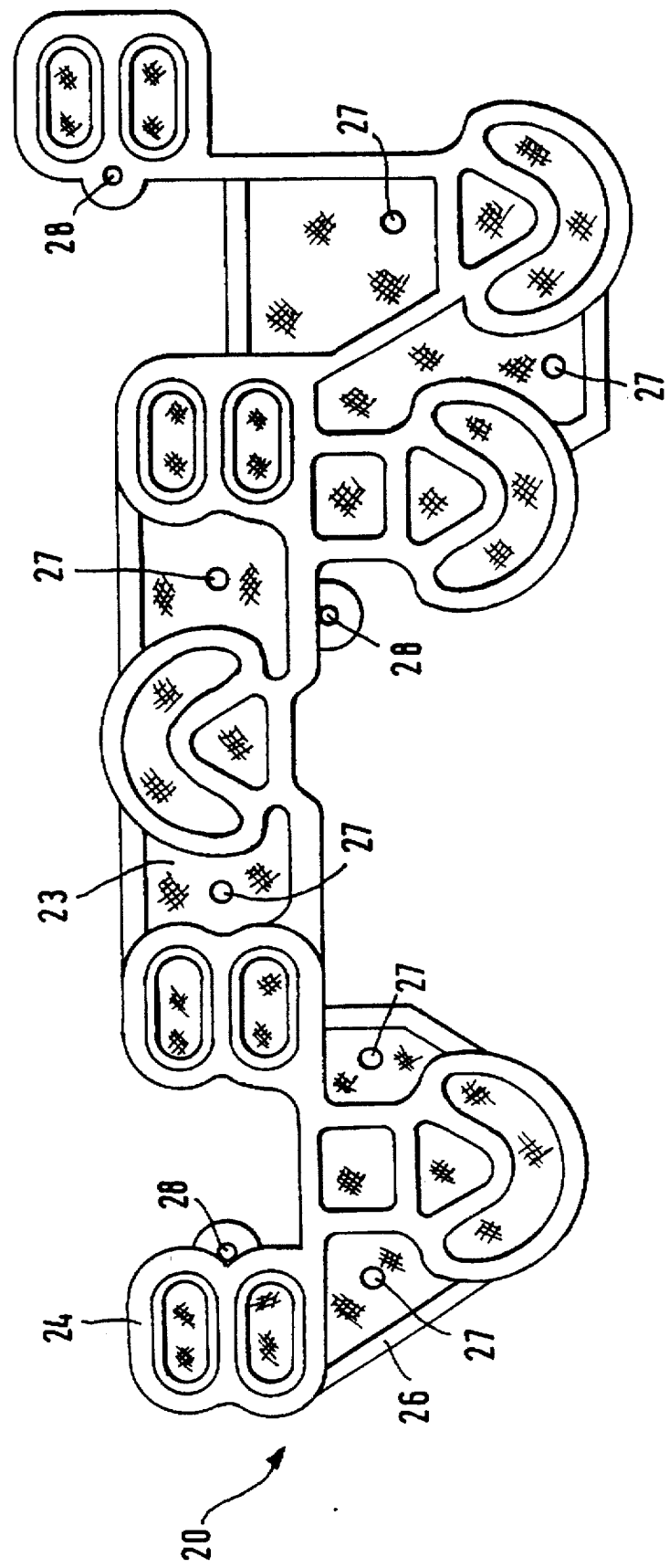
FIG. 2 is a view showing a sealing element of the inventive hydraulic unit in a longitudinal cross-section.

The sealing element 20 shown in FIG. 2 and having a sealing strand 24 composed of an elastomeric material has a closed outer contour. Connecting strands 26 are formed between the individual sealing strands 24 and do not perform any sealing function. Conventionally they are composed of the same elastomeric material as the sealing strand 24. The sealing strands 24 and the connecting strands 26 can be therefore produced in a single injection step. By variation of the cross-section of the sealing strands 24 or the connecting strands 26 in shape and diameter, the force required for the elastic deformation of the sealing element 20 is influenced.

Edges of a filtering fabric 23 are embedded in the sealing strands 24 and the connecting strands 26 so that fringing or loosening of individual fabric threads is prevented. The filtering fabric is composed of a plurality of fabric layers 23.1, 23.2 which can be offset relative to one another. Regions of the formed elements 20 which do not have filtering function can be composed as transitional regions with a thin layer of elastomeric material covering the filtering fabric 23. Thereby the manufacture of the sealing element 20 is facilitated.

In the mounted condition of the sealing element 20, the sealing strands 24 and the connecting strands 26 are received in the sealing grooves 19 in the supporting plate 13 of the hydraulic unit 10. Thereby a sealing of the supply and discharge passages 14, 15 of the hydraulic unit 10 relative to one another and from outside is guaranteed. The supply or discharge passages 14, 15 of the hydraulic unit 10 open in the region of the sealing element 20 which is limited by the sealing strands 24 and has the filtering fabric 23. Here the filtering of the pressure medium takes place. The regions of the filtering fabric 23 located outside the supply and discharge passages 14, 15 are used for position fixing of the sealing element 20 on the supporting element 13 of the hydraulic unit 10. For this purposes recesses 27 are provided in the filtering fabric 23 and in the not shown mounted condition of the sealing element 20 and fixing elements 21 extend through the recesses. The fixing elements are formed on the sealing surface 18 of the supporting plate 13 and are plastically deformed after mounting of the sealing element 20. The sealing element 20 is therefore connected with the hydraulic unit 10 non-releasably.

For exact positioning of the sealing element 20, positioning openings 28 are provided. The positioning openings 28 are arranged in specially expanded regions of the sealing strands 24.

Figure 3:
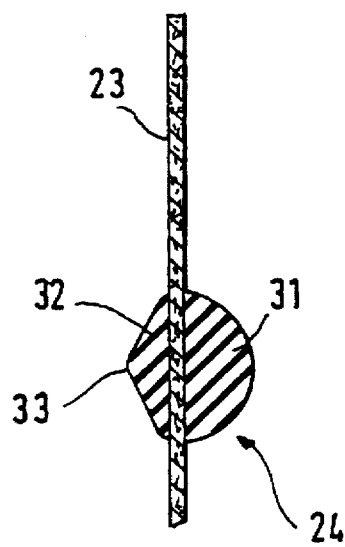
FIGS. 3 and 4 are views showing a cross-section of a sealing element with different embodiments of sealing strands.

FIG. 3 shows an especially advantageous cross-sectional shape for the sealing strand 24 and for the connecting strand 26. It can be seen how the elastomeric material is injected around the filtering fabric 23. The filtering fabric 23 separates the cross-sectional shape into two partial regions 31 and 32. The first partial region 31 has a semi-round shape while the second partial region 32 forms a sealing lip 33. Because of this structural shape, the partial region 31 which in the mounted condition of the sealing element 20 cooperates with the sealing groove 19 formed in the supporting plate 13 of the hydraulic element 10, is relatively rigid and therefore can take up relatively high pressing forces. The partial region 32 which in the case of mounting, is supported on the metallic contour plate of a fabric is formed to the contrary relatively yielding. This leads to a good tolerance compensation in the event of low pressing forces.

Figure 4:
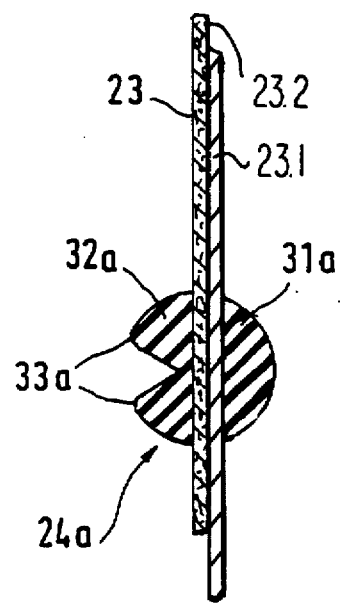

In FIG. 4 the partial region 32a forms two sealing lips 33a so that a yieldable shape is provided and leads to an especially good sealing. In correspondence with the above mentioned embodiment, the sealing element 20 serves on the one hand for sealing of the supply and discharge passages 14, 15 from one another and outwardly, and on the other hand filters the dirt contained in the pressure medium which otherwise can damage the regulator and the hydraulic consumer. Furthermore, the sealing element 20 compensates relative movements between the hydraulic element 10 and, for example, the transmission due to different temperature expansion or due to different vibration loads.

Figure 7:
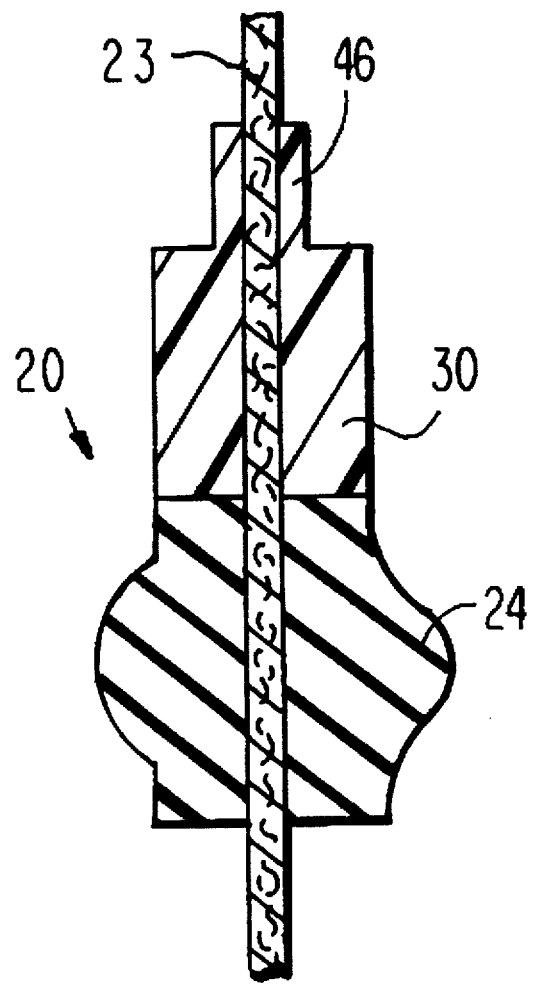
FIG. 7 shows a further embodiment of a strand of the inventive unit.

It is to be understood that changes and advantages modifications of the shown embodiment are possible. It is for example possible to improve the shape stability of the sealing element 20 by the use of a frame part 30 of a thermoplastic synthetic material or of steel as shown in FIG. 7. The frame part 30 extends substantially along the sealing strand 24 of the sealing element 20. The elastomeric material of the sealing strand 24 can be therefore vulcanized or injectionmolded on the frame part 30. It surrounds the frame part at least partially and connects the frame part with the filtering fabric 23. The shape stability of the sealing element 20 can be further improved when the sealing strand 24 and the connecting strand 26 are composed of different elastomeric materials. It is further advantageous when the filtering fabric 23 is of one-layer or multi-layered with layers offset or turned relative to one another. The filtering fabric 23 can be composed of steel, synthetic plastic material or special paper.

Figure 5:
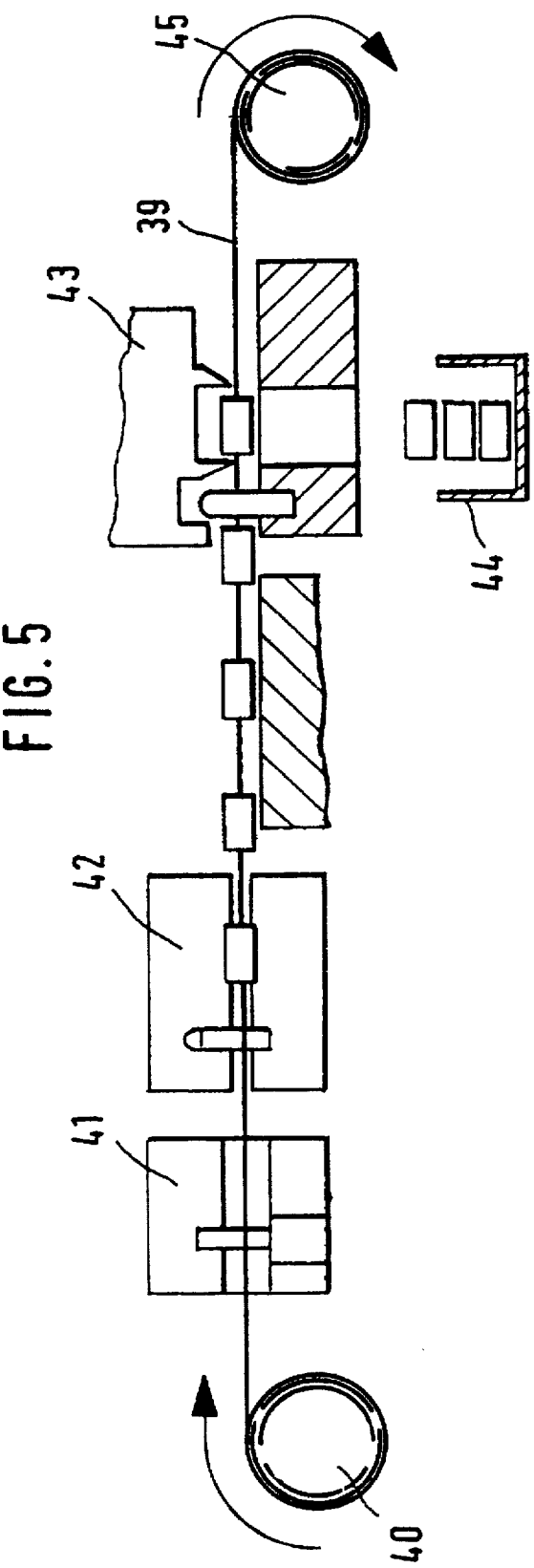
FIGS. 5 and 6 are views schematically illustrating a manufacturing process for the sealing element.

A method of producing the sealing element 20 is schematically shown in FIG. 5 and utilizes a fully automatic process.

An initial product for the method is formed as a continuous fabric web 39 and a filtering web 23 rolled on a freely turnable drum 40. It is supplied in a cycled fashion to several successive manufacturing devices 41, 42, 43 in which the individual process steps are performed. A basic condition for an automatic process are the recesses 27 in the fabric web 39, which are provided for feeding or for positioning the fabric web 39 in the individual manufacturing devices 41, 42, 43. The recesses 27 at the beginning of the manufacturing processes are provided in the fabric web 39 by a punching tool 41 and can be used in the end product in connection with the housing-side fixing pins for their position-fixing on the sealing side 18 of the hydraulic unit 10. In a first process step the fabric web 39 provided with the recesses 27 is supplied to a vucalization tool 42. The second process step takes place in it, in which process step the sealing strands and the connecting strands 24, 26 are vulcanized at both sides on the fabric web 39. The produced intermediate product is supplied after this to the separating tool 43 formed for example as a cutting or punching tool. In the following third process step, the end product, for example, the sealing element 20 is separated from the fabric web 39. The finished sealing elements 20 are received from a container 44 while the remaining cut off portions of the fabric web 39 are rolled onto a residue drum 45. The residue drum 45 is cyclically rotatably moved by a not shown drive motor and provides the cyclical feeding of the web plan 39. The rotary angle of running of the residue drum 45 during each working cycle is measured so that the fabric web 39 after each process step is moved forward by the length of a sealing element 20. Thereby a continuous manufacturing process is provided.

During separation of the sealing element 20 from the fabric web 39, damages of the sealing contour, protruding sharp fabric ends or loose fabric pieces due to an unavoidable positioning inaccuracy in the fabric web 39 in the separating tool 43 must be avoided. For this purpose the sealing and connecting strands 24, 26 which limit the outer contour are formed in a special manner.

Figure 6:
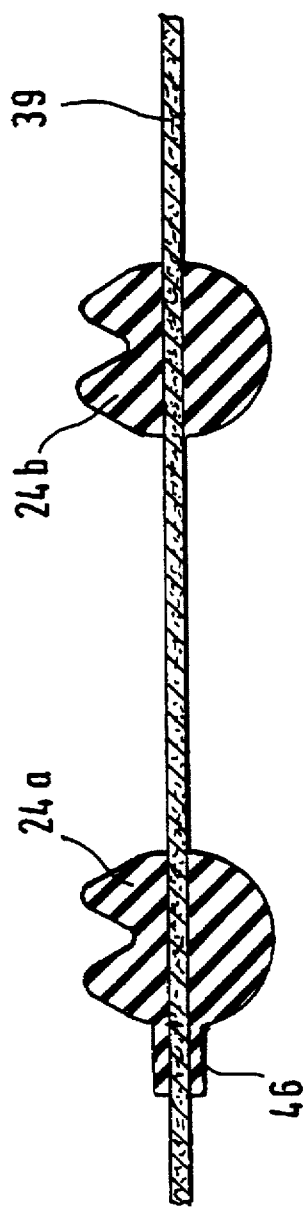

FIG. 6 shows a cross-section of a portion of the fabric web 39 in condition after the second process step. Two sealing strands 24a and 24b vulcanized on the fabric web are illustrated. The first sealing strand 24a expanded by an elastomeric edge 46 limits the outer contour of the sealing element 20, while the second sealing strand 24b extends in the interior of the sealing contour. The elastomeric edge 46 extends radially to the cross-section of the first sealing strand 24 and is located at the side facing away from the second sealing strand 24b. The elastomeric edge 46 surrounds the filtering web 23 at both sides. In the subsequent, third process step in which the finished sealing elements 20 are separated from the fabric web 39, the elastomeric edge 46 is separated as full as possible from the remaining sealing strand 24a. In the finished end product a cross-sectional differences between both sealing strands 24a and 24b are no longer recognizable. The cut extending through the elastomeric edge 46 has the advantage that during the cutting step at the cutting edge of the sealing element 20 no fabric pieces are released which can constitute a quality risk for the filtering or sealing function of the sealing element 20. Because of the above-described manufacturing process, cost-favorable synthetic plastic with low stability and also not-calendered steel fabric can be reliably processed. In a non-automated processes such fabrics can cause problems during insertion in the vulcanization tool 42, which produced a fluctuating manufacturing quality for the sealing element 20.

It will be understood that each of the elements described above, or two or more together, may also find a useful application in other types of constructions differing from the types described above.

While the invention has been illustrated and described as embodied in a hydraulic unit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hydraulic unit, comprising a supporting plate provided with supply, return, and discharge passages; at least one electromagnetic regulator inserted in said supporting plate and controlling said passages; at least one sealing element provided with strands, said supporting plate having an end surface at which said passages open, said strands being arranged at said end surface; a flexible, filtering fabric, said strands of said sealing element extending at least along an outer contour of said fabric and having at least one branching, said strands extending at both sides of said filtering fabric and having at least one region through which a pressure medium flows and at least one region through which the pressure medium does not flow.

2. A hydraulic unit as defined in claim 1, wherein said strands of said sealing element are formed as sealing strands.

3. A hydraulic unit as defined in claim 1, wherein said strands of said sealing element are formed as connecting strands.

4. A hydraulic unit as defined in claim 1, wherein said regions of said sealing elements through which the pressure medium does not flow has recesses, said supporting plate having fixing elements extending in said recesses.

5. A hydraulic unit as defined in claim 4, wherein said fixing elements are formed so that after mounting of said sealing element they are plastically deformed to provide a non-releasable connection.

6. A hydraulic unit as defined in claim 1, wherein said filtering fabric forms with said strands a one-piece sealing element.

7. A hydraulic unit as defined in claim 1, wherein said filtering fabric is embedded between said strands of said sealing element.

8. A hydraulic unit as defined in claim 1, wherein said filtering fabric is composed of a plurality of fabric layers located one behind the other.

9. A hydraulic unit as defined in claim 8, wherein said fabric layers of said filtering web are offset relative to one another.

10. A hydraulic unit as defined in claim 8, wherein said fabric layers of said filtering web are turned relative to one another.

11. A hydraulic unit as defined in claim 1, wherein said strands of sealing element include sealing strands and connecting strands composed of an elastomeric synthetic plastic material.

12. A hydraulic unit as defined in claim 1, wherein said strands include sealing strands and connecting strands having different heights.

13. A hydraulic unit as defined in claim 1, wherein said strands of said sealing element include sealing strands and connecting strands which have a symmetrical cross-section relative to a plane of said filtering fabric.

14. A hydraulic unit as defined in claim 1, wherein said strands of said sealing element having sealing strands and connecting strands which have a symmetrical cross-section relative to a plane extending perpendicular to said filtering fabric.

15. A hydraulic unit as defined in claim 1, wherein said strands of said sealing element include sealing strands having two partial regions which include a first partial region cooperating with a sealing groove formed in said supporting plate and having a semi-circular shape, and a second partial region forming as at least one sealing lip.

16. A hydraulic unit as defined in claim 1, wherein said strands of said sealing element include sealing strands which have two partial regions, said partial regions forming at least one sealing lip.

17. A hydraulic unit as defined in claim 1, wherein said strands include sealing strands and connecting strands; and further comprising a frame part surrounded by said sealing strands and said connecting strands.

* * * * *